Jan. 15, 1924.

J. P. KANTAK 1,480,616

ACCELERATING PEDAL OPERATING DEVICE

Filed Feb. 17, 1923

WITNESS.
Harold L. King

INVENTOR
John P. Kantak
BY
Howard P. Denison
ATTORNEY

Patented Jan. 15, 1924.                                    1,480,616

UNITED STATES PATENT OFFICE.

JOHN P. KANTAK, OF MANLIUS, NEW YORK.

ACCELERATING-PEDAL-OPERATING DEVICE.

Application filed February 17, 1923. Serial No. 619,642.

*To all whom it may concern:*

Be it known that I, JOHN P. KANTAK, a citizen of the United States of America, of Manlius, in the county of Onondaga, in the State of New York, have invented new and useful Improvements in Accelerating-Pedal-Operating Devices, of which the following, taken in connection with the accompanying drawings, is a full, clear, and exact description.

This invention relates to an accessory for a motor vehicle having a pedal operated electrical switch for controlling the operation of a starting motor and refers more particularly to hand operated means for depressing the switch operating pedal including a handle mounted on the instrument board directly in front of the driver where it is easily accessible for operating said pedal by hand when desired.

These motor controlling pedals are placed in widely varying positions in different machines while the leg-reach of different drivers of the same machine also varies materially so that it is frequently inconvenient for the drivers to locate the switch operating pedal for operation by the foot and is also inconvenient for different drivers, particularly those with short legs to reach the pedal without sliding forward upon the seat, and the main object of my present invention is to provide a more convenient means which is not only more readily visible but more easily accessible to the driver for operating the switch pedal at the same time, leaving the latter free to be operated by the foot if desired.

Other objects and uses relating to specific parts of the device will be brought out in the following description:

Figure 1:
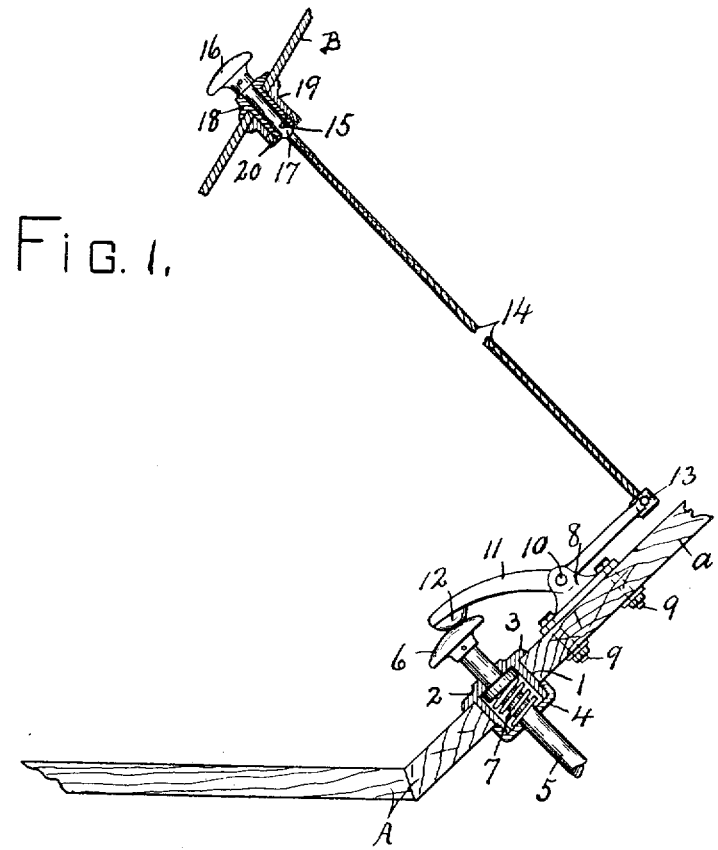
Figure 1 is a side elevation partly in section of my invention together with portions of the floor board and instrument board of the vehicle.
Figure 2:
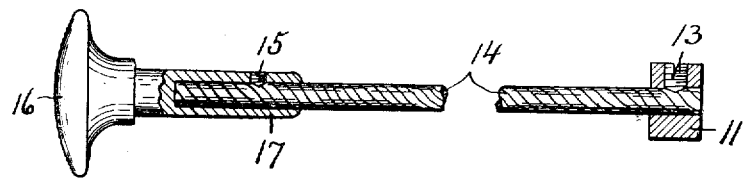
Figure 2 is an enlarged sectional view of the detached pedal operating cable partly broken away together with adjacent portions of the handle and pedal engaging lever showing more particularly the manner of fastening the handle and lever to the opposite ends of the cable.

In order that my invention may be clearly understood, I have shown a portion of a floor —A— having the usual upwardly and forwardly inclining foot board —a— and I have also shown a portion of an instrument board —B— which in many instances is disposed in an upwardly and forwardly inclined plane directly in front of the driver and steering wheel.

The foot board —a— is provided with an opening —1— for receiving a tubular bushing —2— having a flange —3— at its upper end for engaging the adjacent face of the foot board while its lower end is threaded and engaged by a screw cap —4— which also engages the under side of the foot board to firmly clamp the bushing in place.

The bushing and cap —4— are provided with registering apertures for receiving a switch operating pedal rod —5— adapted to be connected in any well known manner to an electric switch for controlling the operation of any of the well known forms of starting motors not shown, the upper end of said pedal rod being provided with a foot piece —6— adapted to be depressed by the foot of the operator against the action of a suitable retracting spring —7— within the bushing —2— and by such depression to close the electric switch for closing the usual battery circuit through the starting motor.

A bracket —8— is secured by bolts —9— to the upper face of the foot board —a— in front of the bushing —2— and pedal —6— and to this bracket is pivoted at —10— a pedal operating lever —11— of the first kind to extend forwardly and rearwardly from its pivot.

The rear end is provided on its under side with a spherical boss —12— adapted to rest upon the upper face of the pedal —6— while the forward end is secured by a set screw —13— to the lower end of an operating cable —14— which in turn has its upper end secured by a set screw —15— to the lower end of a hand piece —16—.

This hand piece extends through an opening in the instrument board —B— for reciprocal movement and is provided with a stem —17— guided in a bushing —18— which in turn extends through the instrument board and engages the upper rear side thereof.

Surrounding the inner end of the bushing —18— is a collar —19— which engages the lower front side of the instrument board and is held in place by a nut —20— engaging the inner threaded end of the bushing and thereby clamping the collar and bushing to opposite faces of the instrument board leaving the handle —16— at the rear side thereof within easy reaching distance of the driver.

It will be observed that the same spring which retracts the starter pedal also retracts the lever —11— and its operating means.

The bushing —18— constitutes a guide for the stem —17— of the handle —16— and is easily and quickly secured in place by the collar —19— and nut —20— after a suitable opening has been formed in the instrument board.

The rear end of the lever —11— may be engaged and depressed by the foot of the operator if desired, independently of the hand piece —16— although the latter serves as the most convenient method of operating the switch pedal by reason of its proximity to the driver and the fact that it is always visible without seriously diverting attention from the road ahead.

In operating the switch pedal —6— it is simply necessary to pull upwardly and rearwardly upon the hand piece —16— which causes a similar movement of the front end of the lever —11— and a corresponding downward movement of the rear end of said lever for depressing the switch pedal, and as soon as the engine is started by the motor, the hand piece —16— may be released and returned by the retracting spring —7— ready for a repetition of the operation when required.

What I claim is:

The combination with a foot board, an instrument board, and an electric switch operating pedal reciprocally movable in an opening in the floor board of a forwardly and rearwardly extending lever of the first kind pivotally mounted upon the floor board and having its rear end engaging the upper face of the switch operating pedal, a hand piece reciprocally movable in an opening in the instrument board and connections between said hand piece and the rear end of said lever for operating the latter to depress the switch operating pedal as the hand piece is moved in one direction.

In witness whereof I have hereunto set my hand this 1st day of February 1923.

JOHN P. KANTAK.

Witnesses:
H. E. CHASE,
RITA CAMPOLIETO.